(No Model.)
E. WESTON.
ELECTRICAL MEASURING INSTRUMENT.
No. 496,500. Patented May 2, 1893.
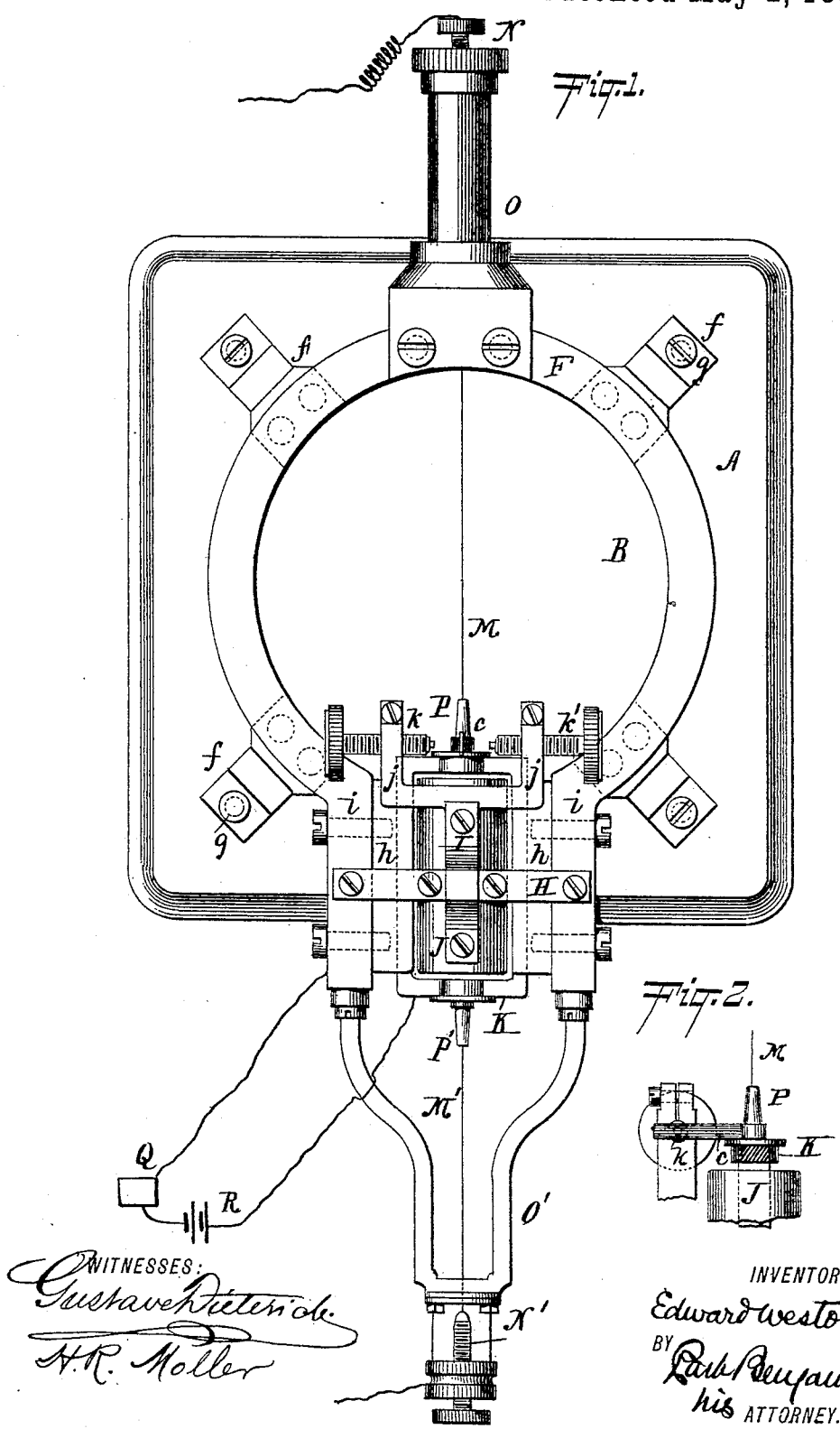
WITNESSES:
Gustave Dieterich
H. R. Moller
INVENTOR
Edward Weston
BY Park Benjamin
his ATTORNEY.

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 496,500, dated May 2, 1893.

Application filed February 17, 1892. Serial No. 421,902. (No model.)

*To all whom it may concern:*

Be it known that I, EDWARD WESTON, of Newark, Essex county, New Jersey, have invented a new and useful Improvement in Electrical Measuring-Instruments, of which the following is a specification.

My invention relates to an apparatus for indicating difference of potential in an electric current circuit established between terminals.

In another application for Letters Patent filed by me on the 8th day of July, 1890, Serial No. 358,070, I have described an instrument containing a magnet, a coil vibrating in the field of force of said magnet, and means for indicating the deflections of the coil. In that instrument I show the coil suspended by a filament and provided with an index needle moving over a suitable scale, on which scale the extent of deflection of the coil is indicated.

In my present device I show a coil suspended between two filaments connected respectively to the top and bottom of the coil and provided with means so arranged that an indication of the movement of the coil may be caused at a point distant from the instrument itself.

The instrument described in my above-named application, as well as that which forms the subject-matter of the present one, was constructed more particularly for use in the electrical protective system patented to me in Letters Patent Nos. 389,273 and 389,272, dated September 11, 1888. In that instrument, change of potential, as I have already stated, was indicated by the movement of an arm carried by the moving coil; and for convenience merely, a scale was added which would show the extent of said motion. In the present instrument, as will be obvious, the scale is omitted, and the indications of the instrument are shown simply by the vibration of the arm or by the fact that the same arm in vibrating moves into or out of contact with adjustable stops, and thereby establishes or breaks another circuit in which there may be some other indicating device.

In the accompanying drawings, Figure 1 is an elevation of my indicating instrument, and Fig. 2 is a detail view showing the indicating arm in side elevation.

F is a permanent magnet supported on brackets, $f$, secured by screws, $g$, to any vertical support such as A having a central opening B. Upon the inner faces of the magnet arms are secured pole pieces, $h$, by screws, $i$. Extending across between the arms of the magnet, is a bar, H, to which is secured a bracket, I, which carries a cylindrical core, J, of magnetic material. The pole pieces, $h$, are made concave, and there is an interval or space between said pole pieces $h$ and the cylinder J. In said space and surrounding the cylinder J, is a coil-supporting frame K provided with projections, as P and P'. To the projection P is fastened the supporting wire or filament M, the upper extremity of which is fastened to an adjusting screw N in a suitable support O. To the projection P' is fastened the wire M', which is also secured to an adjusting screw N' in a support O'. It will be apparent, therefore, that the coil and frame K are supported between the two tense wires M and M', and that said wires acting conjointly serve both as a suspension device for the coil and also act as springs resisting the rotation of said coil and tending to return it to its normal position when the current through the instrument is interrupted.

Supported on the bracket I is a forked bracket, $j$, through the arms of which pass the adjustable screws $k$ and $k'$. On the frame K is an arm, $c$, which, if desired, may extend over any suitable scale, or which may carry a disk or any other device for rendering its movement more apparent, if such be desired. The arm $c$ extends between the extremities of the adjustable stops $k$ and $k'$. The circuits in the instrument are as follows:—From the adjusting screw N to the filament M, through the coil supported on frame K, to the filament M' and thence to the adjusting screw N', and so out of the instrument.

It is, of course, to be understood that there is no electrical connection between the terminals N and N', suitable insulation being inserted. When the coil K is traversed by a current, it tends to rotate and set itself in a new angular position in the intense field of force produced between the cylinder J and the pole pieces $h$, and the extent of this movement will depend upon the difference of potential between the terminals of the instrument. This movement may be recognized either by simple observation of the coil, or by noting the extent of movement of the arm $c$ thereon, or, if desired, by measuring the extent of that movement on any suitable scale applied in proximity to said arm $c$. When, however, it is desired that the movement of the coil shall actuate or control other mechanism, then the screws or stops $k\ k'$ are employed; one terminal of a local circuit including any indicating, recording, measuring, or registering device, as at Q, and a battery, as at R, is electrically connected to said screws $k\ k'$, and the other one to the frame K and arm $c$. The circuit therefore proceeds from one pole of the battery R through the suspended frame K to the arm $c$, and from the other pole of the battery R to either one or both of the screws $k\ k'$.

Of course it is to be understood that suitable insulation is to be arranged in accordance with this disposition of the circuit. Then when the arm $c$ meets one or the other of the stops or screws $k\ k'$, it will establish circuit through the battery R and indicator Q. If it be desired that the circuit shall be established only when the arm $c$ touches one of the screws $k$, a tip of insulating material can, of course, be applied to the other screw, which then becomes simply a limiting stop, such as is used in telegraph sounders, and other like contrivances.

The advantage of such an instrument as I have described when applied to purposes substantially as originally intended, is that the main circuit may give an indication at one point and also cause another indication to be given at another point; the indication at the second point being a check and a means of control over those whose duty it is to observe the indication at the first point. And, furthermore, as the extent of the indication, in either case, will depend upon the difference of potential between the terminals of the instrument, it follows that unless a certain current operates in the instrument to cause a sufficient movement of the needle or arm $c$, or in other words, unless there is sufficient difference of potential set up between its terminals, no indication will reach the second or checking station. It will be seen, therefore, that the instrument is not merely a burglar alarm indicator, but an instrument which both indicates and measures, and which may be controlled by definite potential differences, if desired.

I claim—

1. The combination in an electrical apparatus of a permanent magnet, a vibrating loop conductor arranged between the poles thereof, and means for making and breaking an electrical circuit controlled by the vibration of said conductor due to a current traversing it.

2. The combination in an electrical apparatus of a permanent magnet, a loop conductor rotary on a diametral axis and disposed between the poles of said magnet, the said conductor being in main circuit, a contact arm carried by said conductor and a contact stop or point in the field of movement of said arm; the said stop being in separate or relay circuit.

3. The combination in an electrical apparatus of a permanent magnet, F, a coil supported and rotary between the poles of said magnet, a contact arm, $c$, carried by said coil, and a contact stop, $k$, in the path of said arm; the said coil being disposed in one circuit, and the said contact arm $c$ and stop $k$ being disposed in another circuit.

EDWARD WESTON.

Witnesses:
H. R. MOLLER,
M. BOSCH.